United States Patent [19]

Mulflur et al.

[11] Patent Number: 4,681,768

[45] Date of Patent: Jul. 21, 1987

[54] TREATMENT OF COOKING OILS AND FATS

[75] Inventors: W. Joseph Mulflur, Jeffersonville, Ind.; James R. Munson, Houston, Tex.

[73] Assignee: Reagent Chemical & Research Company, Middlesex, N.J.

[21] Appl. No.: 765,456

[22] Filed: Aug. 14, 1985

[51] Int. Cl.[4] ........................... A23D 5/02; C09F 5/10

[52] U.S. Cl. .................................... 426/417; 426/423; 426/442; 260/428

[58] Field of Search ........................ 426/417, 423, 442; 260/428

[56] References Cited

U.S. PATENT DOCUMENTS

| | | | |
|---|---|---|---|
| 3,231,390 | 1/1966 | Hoover | 426/417 |
| 3,954,819 | 5/1976 | Husch | 426/417 X |
| 4,112,129 | 9/1978 | Duensing et al. | 426/423 X |
| 4,330,564 | 5/1982 | Friedman | 426/417 |
| 4,508,742 | 4/1985 | McLaughlin et al. | 426/423 X |

*Primary Examiner*—Robert Yoncoskie
*Attorney, Agent, or Firm*—Elliot M. Olstein

[57] ABSTRACT

Cooking oil is treated with synthetic amorphous magnesium silicate having a surface area of at least 300 square meters per gram to permit reuse of the oil for cooking.

11 Claims, No Drawings

TREATMENT OF COOKING OILS AND FATS

This invention relates to the treatment of cooking oils and fats.

In recent years there has been a growth in the use of cooking oils and fats for cooking of foods such as chicken, potatoes, pies, fish, etc.

In the frying operation, large quantities of edible cooking oils or fats are heated in vats to temperatures in the order of 315°-375°, and the food is immersed in the oil or fat for cooking. During repeated use of the cooking oil or fat, the high temperatures cause the formation of free fatty acids (FFA). An increase in the FFA decreases the oil's smoke point and results in increasing smoke as the oil ages.

In addition, when cooking, there is an oxidative degeneration of fats which results from contact of air with hot oil producing oxidized fatty acids (OFA). Heating transforms the OFA into secondary and tertiary by-products which may cause off-flavors and off-odors in the oil and fried food. Moreover, caramelization (which is a browning reaction which occurs when foods containing carbohydrates and proteins are exposed to heat) occurs during the use of the oil over a period of time, resulting in a very dark color of the oil which, combined with other by-products, produces dark, unappealing fried foods.

Because of the tremendous cost resulting from the replacing of the cooking fats and oils after use thereof (normal useful life generally in the order of 2-10 days), the industry has searched for an effective and economical way to slow degradation of fats and oils and extend their usable life.

U.S. Pat. No. 4,112,129 granted on Sept. 5, 1978 discloses that a composition comprised of diatomite, synthetic calcium silicate hydrate and synthetic magnesium silicate hydrate may be employed for reclaiming used fats and oils. The patent further indicates that a synthetic magensium silicate hydrate may not be used, by itself, for such purposes.

The present invention is directed to providing an improved procedure for treating used cooking oils and/or cooking fats so as to permit use thereof over longer periods of time.

In accordance with one aspect of the present invention, there is provided a process for treating a shortening such as a cooking oil and/or cooking fat, which has been used so as to extend the useful life thereof wherein the used cooking oil and/or fat is contacted with an activated high surface area synthetic amorphous magnesium silicate in an amount for reclamation and reuse of such shortening.

More particularly, the cooking oil and/or cooking fat is treated with an activated hydrated synthetic magnesium silicate which has a surface area of at least 300 square meters per gram in that such treatment is effective for extending the useful life of the cooking oil and/or fat.

Although applicant does not intend to be bound by any theoretical reasoning, it is believed that the magnesium silicate functions to adsorb polar compounds of degradation such as but not limited to FFA, OFA, color bodies and secondary and tertiary by-products of degradation, which can be subsequently removed during the normal filtration of the used oil and/or fat.

The magnesium silicate may function as a filter aid, or may be employed in conjunction with another filter aid during the filtration of the oil, as generally practiced in the art.

The magnesium silicate employed in accordance with the present invention removes soluble contaminants, thereby slowing the degradation of the oil and fat. In addition to removing food particles, the magnesium silicate decolorizes and deodorizes leaving clearer, cleaner and fresher oils and/or fats.

The magnesium silicate used in accordance with the present invention slows the buildup of FFA, other polar compounds and OFA, which increases the usable life of the cooking oil and/or fat.

The hydrated magnesium silicate which is employed in accordance with the present invention has a surface area of at least 300 square meters per gram, and preferably has a surface area in the order of from 400-600 square meters per gram. In addition, such magnesium silicate is preferably employed as coarse particles, with at least 75%, and preferably at least 85% of the particles having a particle size which is greater than 400 mesh, and with no more than 15%, and preferably no more than 5%, all by weight, having a particle size greater than 40 mesh. In most cases, the average particle size of the magnesium silicate employed in accordance with the present invention is in the order of but not limited to 20-75 microns. It is to be understood, however, that the magnesium silicate may have a particle size different than the preferred size. For example, the magnesium silicate may be used as a finely divided powder; i.e., 50% or more passes through a 325 mesh screen.

In addition, the hydrated magnesium silicate which is employed in accordance with the present invention generally has a bulk density in the order of from 15-35 lbs/cu.ft., a pH of 7-10.8 (10% water suspension) and a mole ratio of mgO to $SiO_2$ of 1:2 to 1:4.

The following is a specification and typical value for a magnesium silicate which is employed in accordance with the present invention:

TABLE I

| Parameter | Specification | Typical Value |
|---|---|---|
| Loss on Drying at 105° C. | 15% max. | 12% |
| Loss on Ignition at 600° C. | 8 to 12% | 10% |
| Mole Ratio $MgO:SiO_2$ | 1:2.25 to 1:2.75 | 1:2.60 |
| pH of 5% Water Suspension | 9.1 ± 0.5 | 9.2 |
| Soluble Salts as % $SO_4$ by wt. | 1.5 max. | 1.0% |
| Sieve Analysis: | | |
| % on 40 mesh | 5% max. | 1% |
| thru 400 mesh | 15% max. | 10% |
| Bulk Density (packed) | 25 to 32 $lbs/ft^3$ | 27 |
| Surface Area (B.E.T.) | 300 $M^2/g$ min. | 400 |
| Refractive Index | | Approx. 1.5 |

The magnesium silicate employed in accordance with the present invention can be used to treat used cooking oil and/or fats in conjunction with any one of the wide variety of operations for filtering used cooking oils and/or fats.

The present invention is applicable to continuous filtration systems in which the used oil is continuously circulated through filtration units and back to the frying vats and/or vat systems wherein one or more times a day the contents of each frying vat are filtered through a batch type filter. The magnesium silicate employed in accordance with the present invention may be employed as both a precoat and a body feed in either a continuous or batch filtration system.

In conventional cooking apparatus, in general, a dosage of at least 0.002 lb. and preferably at least 0.01 lb. of the magnesium silicate is employed per pound of used cooking oil. The selection of an optimum amount will depend upon but not be limited to the frequency of treatment and the condition of the oil. The magnesium silicate is used in an amount effective to reduce FFA or color or other contaminant levels so as to permit reuse of the oil. The maximum amount will be determined by economics and flow properties in the operation. In general, the treatment is effected in a manner such that the cooking oil or fat is not cooled to a temperature below 150° F. In most cases, the treatment temperature should not exceed 375° F.; however, it may be possible to expose the oil and/or fat to such higher temperatures for a period of time during the treatment cycle without an adverse effect on the oil.

In accordance with the present invention, as hereinabove indicated, after treatment with the magnesium silicate, the treated oil may be combined with a conventional filter aid for subsequent filtration. It is to be understood, however, that in most cases the magnesium silicate may be employed and followed by filtration, without the addition of a conventional filter aid.

The magnesium silicate employed in accordance with the present invention is capable of maintaining contaminant levels below the point of discard for an extended period of time.

Applicant has found that the use of the present invention may be effected daily so as to extend the useful life of the cooking oil without adversely affecting food quality. For example, it is possible to employ the cooking oil for substantially extended periods of double the normal usable life obtained without such treatment, although it is to be understood that longer or shorter periods may be observed.

The invention will be further described with respect to the following examples; however, the scope of the invention is not to be limited thereby.

EXAMPLE I

For a 50 lb. batch of used cooking oil the following procedure will reduce the buildup of FFA, OFA, color and odor:

1. Shut off fryer.
2. Pour two 8 fluid ounce measuring cups of Magnesium Silicate of Table I (Magnesol ® Magnesium Silicate) by Reagent Chemical & Research, Inc. (approximately 1.0% by weight of oil) directly into the fryer and stir thoroughly.
3. Drain hot oil into commercially available mechanical vacuum-type fat filter. Optimum adsorption is achieved at 300° F.; however, temperatures between 150° F.-375° F. have produced good results.
4. Recirculate hot oil for 1-20 minutes.
5. Pump cleaned, polished oil back into fryer for reuse.
6. Dispose of filter cake.

By following the above procedure daily in a side-by-side test using a diatomite to treat one fryer vat and magnesium silicate to treat another fryer vat the following results were observed after ten days of frying.

| | D.E. | Magnesium Silicate |
|---|---|---|
| FFA | 1.57% | 0.76% |
| OFA | 0.32% | 0.17% |
| Color (photometric) | 18.97 | 6.68 |

EXAMPLE II

For a one thousand gallon batch of used cooking oil with a FFA concentration of 1.5%, the following procedure will improve color and odor while reducing FFA to 1.0%:

1. Drain hot oil from frying machinery to a treatment tank. It is not necessary to cool the oil.
2. Add 225 lbs. (3.0% by weight of oil) of Magnesium Silicate of Table I (Magnesol ® Magnesium Silicate by Reagent Chemical and Research, Inc.).
3. Stir with gentle agitation for 15-30 minutes.
4. Pump oil through suitable filter until desired clarity is achieved.
5. Pump cleared, polished oil back into frying machinery for reuse.
6. Dispose of filter cake.

The present invention is particularly advantageous in that the useful life of cooking oil and/or fat (shortening), which has been used for the high temperature frying of foods, can be extended, thereby reducing the overall cost. The use of magnesium silicate in accordance with the present invention maintains FFA levels below the disposal threshold, and filtration may be accomplished at high flow rates and with low pressure drops, whereby the magnesium silicate may be employed in combination with commercial shortening filters.

The above advantages, and other advantages, should be apparent to those skilled in the art from the teachings herein.

Numerous modifications and variations of the present invention are possible in light of the above teachings and, therefore, within the scope of the appended claims, the invention may be practiced otherwise than as particularly described.

What is claimed is:

1. A process for treating used cooking oil or fat, comprising:

contacting used cooking oil or fat with a high surface area amorphous synthetic magnesium silicate having a surface area of at least 300 sq. meters per gram, said magnesium silicate being employed in an amount effective to reduce the content of free fatty acid in the oil or fat and permit reuse of the oil or fat for cooking.

2. The process of claim 1 wherein the magnesium silicate has a surface area of 400-600 square meters per gram.

3. The process of claim 2 wherein the magnesium silicate has a particle size such that at least 75% of the particles have a size greater than 400 mesh and no more than 15% have a particle size greater than 40 mesh.

4. The process of claim 2 wherein the magnesium silicate has an average particle size of from 20-75 microns.

5. The process of claim 4 wherein the magnesium silicate has a bulk density of from 25-32 lbs./cu.ft.

6. The process of claim 1 wherein the magnesium silicate is employed in an amount of at least 0.002 lb./lb. of oil or fat.

7. The process of claim 6 wherein subsequent to said contacting, the oil is filtered to remove particulate material.

8. The process of claim 7 wherein the oil is filtered in the presence of a filter aid.

9. The process of claim 7 wherein the magnesium silicate has an average particle size of from 20-75 microns.

10. The process of claim 9 wherein the magnesium silicate has a surface area of 400-600 sq. meters per gram.

11. The process of claim 10 wherein the magnesium silicate has a bulk density of from 25-32 lbs. per cu. ft.

* * * * *